(12) United States Patent
Jones-McFadden

(10) Patent No.: US 12,315,358 B2
(45) Date of Patent: May 27, 2025

(54) PANIC BUTTON INTERVENTION

(71) Applicant: Wells Fargo Bank, N.A., San Francisco, CA (US)

(72) Inventor: Alicia C. Jones-McFadden, Fort Mill, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/768,887

(22) Filed: Jul. 10, 2024

(65) Prior Publication Data

US 2024/0362992 A1 Oct. 31, 2024

Related U.S. Application Data

(63) Continuation of application No. 18/049,783, filed on Oct. 26, 2022, now Pat. No. 12,080,148.

(51) Int. Cl.
*G08B 25/01* (2006.01)
*G08B 25/12* (2006.01)
*H04L 51/046* (2022.01)

(52) U.S. Cl.
CPC .......... *G08B 25/014* (2013.01); *G08B 25/12* (2013.01); *H04L 51/046* (2013.01)

(58) Field of Classification Search
CPC ...... G08B 25/014; G08B 25/12; H04L 51/046
See application file for complete search history.

(56) References Cited

U.S. PATENT DOCUMENTS

| | | |
|---|---|---|
| 7,006,605 B1 | 2/2006 | Morganstein et al. |
| 7,154,398 B2 | 12/2006 | Chen et al. |
| 8,116,724 B2 | 2/2012 | Peabody |
| 8,588,733 B2 | 11/2013 | Ferguson et al. |
| 8,618,930 B2 | 12/2013 | Papadopoulos et al. |
| 9,774,966 B1 | 9/2017 | Bundy et al. |
| 10,754,433 B2 | 8/2020 | Lopez Lecube et al. |
| 10,762,769 B1 | 9/2020 | Sommerlatt |
| 10,818,160 B2 | 10/2020 | Nepo |
| 2001/0011230 A1 | 8/2001 | Morganstein et al. |
| 2002/0080028 A1 | 6/2002 | Edwards |
| 2004/0088345 A1 | 5/2004 | Zellner et al. |
| 2004/0097222 A1 | 5/2004 | Kake et al. |
| 2005/0192831 A1* | 9/2005 | Ellison ............ G06Q 10/06398 705/345 |
| 2010/0010371 A1 | 1/2010 | Zayfert et al. |
| 2011/0037571 A1 | 2/2011 | Johnson, Jr. et al. |

(Continued)

OTHER PUBLICATIONS

"U.S. Appl. No. 18/049,783, Non Final Office Action mailed Mar. 27, 2024", 16 pgs.

(Continued)

*Primary Examiner* — Chico A Foxx
(74) *Attorney, Agent, or Firm* — SCHWEGMAN LUNDBERG & WOESSNER, P.A.

(57) ABSTRACT

Various systems and methods for registering a panic button for intervention are described herein. A system is configured to receive at a server, an indication that a panic button was used by a user; access a database to determine a responsive action, the responsive action being one of: transmitting a speaking prompt or activating a device function of a device associated with the user; and establish a communication session with the user to perform the responsive action.

20 Claims, 5 Drawing Sheets

(56) References Cited

U.S. PATENT DOCUMENTS

| | | |
|---|---|---|
| 2015/0015381 A1 | 1/2015 | Mcnutt et al. |
| 2015/0201275 A1 | 7/2015 | Lee |
| 2016/0021154 A1 | 1/2016 | Schoeffler |
| 2016/0232304 A1 | 8/2016 | Goyal |
| 2017/0005958 A1 | 1/2017 | Frenkel et al. |
| 2018/0308342 A1 | 10/2018 | Hodge |
| 2019/0213498 A1 | 7/2019 | Adjaoute |
| 2020/0066128 A1 | 2/2020 | Momin |
| 2020/0135005 A1 | 4/2020 | Katz et al. |
| 2020/0160690 A1 | 5/2020 | Kurani et al. |
| 2022/0383260 A1* | 12/2022 | Palamadai ............ H04L 67/306 |
| 2023/0024798 A1 | 1/2023 | Patton |
| 2023/0154307 A1 | 5/2023 | Nakashima |
| 2023/0178099 A1 | 6/2023 | Haimi-Cohen et al. |
| 2023/0210372 A1 | 7/2023 | Alam et al. |
| 2023/0317274 A1 | 10/2023 | Alam |

OTHER PUBLICATIONS

"U.S. Appl. No. 18/049,783, Notice of Allowance mailed Jun. 26, 2024", 14 pgs.

"U.S. Appl. No. 18/049,783, Response filed Jun. 5, 2024 to Non Final Office Action mailed Mar. 27, 2024", 8 pgs.

\* cited by examiner

PANIC BUTTON INTERVENTION

CROSS-REFERENCE TO RELATED APPLICATION

This application is a continuation of U.S. patent application Ser. No. 18/049,783, filed Oct. 26, 2022, which is incorporated by reference herein in its entirety.

BACKGROUND

Some individuals may find it difficult to be assertive with others when necessary. For example, an elderly individual actively speaking with a fraudster over the phone may have a hard time termination or redirecting the call after realizing that the call is related to a scam. Even after a call has finished, the realization may overwhelm the individual, causing delays in taking responsive measures, such as freezing accounts or reporting the call.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide a panic button for intervention in situations where the user is unable to otherwise interrupt or intervene to exit, cease, or disrupt an interaction. The panic button (also referred to as an alarm button) may be a physical button or a user interface mechanism that can be programmed to perform a number of functions upon its activation. The panic button may be implemented or incorporated into a wearable device, a cellular phone, an Internet-of-Things (IoT) device, a household appliance, or other convenient mechanisms so that the user has quick and easy access to its functionality. Various operations may be initiated in response to the panic button being activated. Operations such as calling a relative for assistance, calling a bank operator or financial manager, freezing financial accounts, placing a fraud alert on a financial account, contacting authorities, or the like.

While there are some implementations that provide an "SOS" or contact emergency services, such implementations are more suited for contacting a fire department or police in case of emergency. What is needed is facilities to help a non-assertive or vulnerable person in situations where it is difficult to deftly escape, such as to terminate a telemarketer call or a door-to-door sales pitch.

Figure 1:
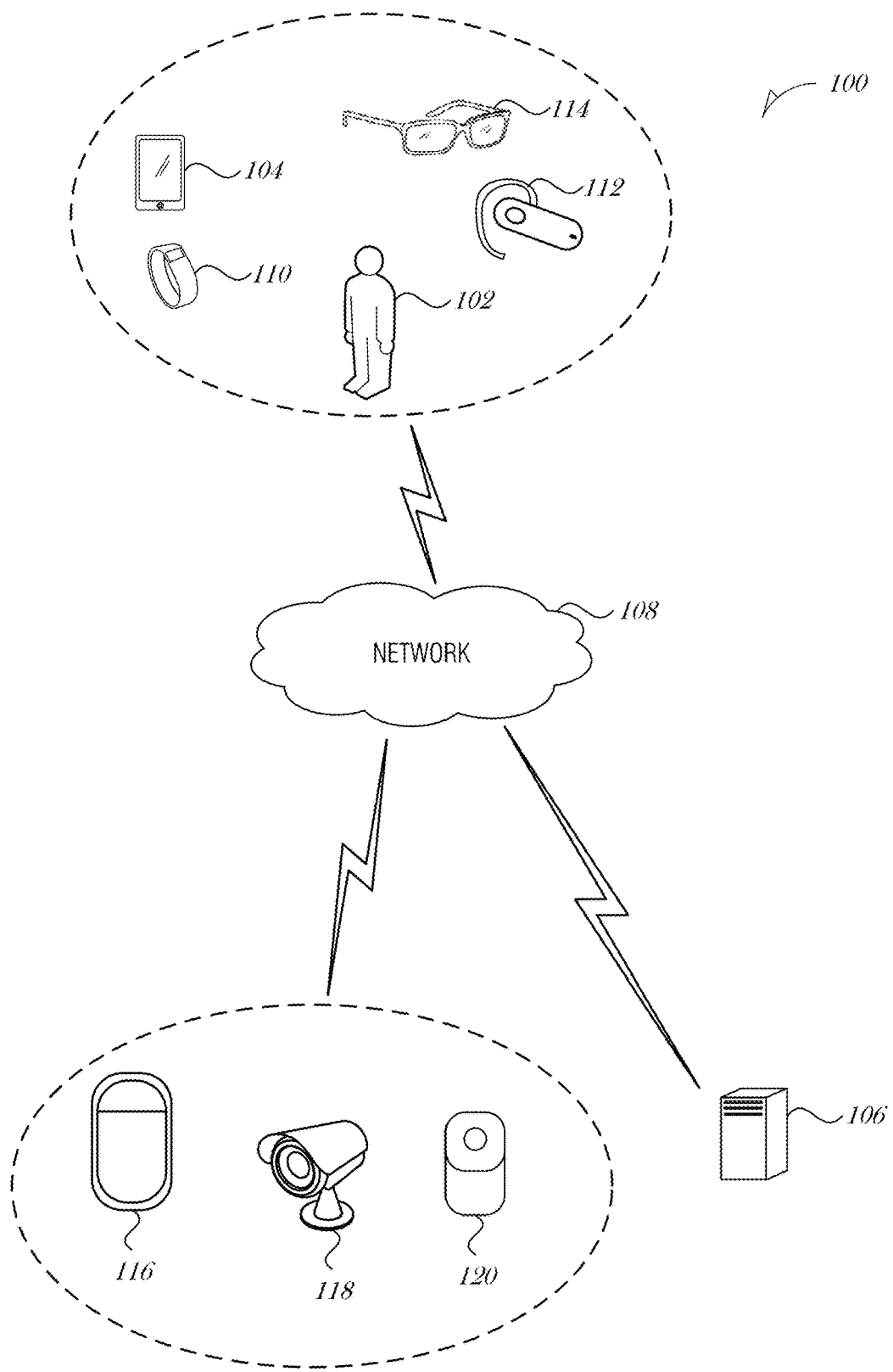
FIG. 1 is a diagram illustrating an operating environment, according to an embodiment.

FIG. 1 is a diagram illustrating an operating environment 100, according to an embodiment. A user 102 may use a smartphone 104 to access an online service 106. The online service 106 may provide any type of service involving sensitive information, such as a banking service, an investment service, a tax service, an estate planning service, a human resources service, a social media platform, an online store, or the like. To connect to the online service 106, the user 102 may execute an application ("app") to connect to the online service 106 via a network 108. The user 102 may have one or more additional devices, such as a wearable device like a smartwatch 110, smartglasses 114, a smart ring, e-textile, headphones 112, ear buds, or the like.

Additionally or alternatively, various other smart appliances, home automation products, or Internet-of-things (IoT) devices may be installed, placed, or available in the operating environment 100. For instance, the operating environment 100 may be a residential environment, such as the user's home. Devices such as a personal assistant 116, security camera 118, or smart doorbell 120 may be available in the environment 100. The personal assistant 116 may be a device like the Amazon Echo products, Google Home products, Google Assistant and Nest products, Apple HomePod, or other types of devices that are able to monitor an environment for spoken commands or other verbal input and provide responsive functions based on the received audio input. The personal assistant 116 may also interface with other smart devices, network services, emergency services, and the like, acting as a hub or a central controller. Other types of IoT devices may also be available, which are not shown in FIG. 1, such as electronic assistants, refrigerators, thermostats, lighting controllers, sound/stereo/audio system controllers, motion sensors, alarm systems, and the like.

A panic button is provided on one or more devices in the operating environment 100. In various examples, the panic button may be implemented as a soft button in an application on the smartphone 104, smartwatch 110, or in another electronic display provided by an IoT device. The panic button may be a hard button, such as a switch or button on a housing of an IoT device, smartwatch 110, smartphone 104, or the like. In either case, actuating the panic button causes one or more responsive actions. These actions are used to aid the user 102 in terminating, redirecting, or otherwise preventing fraudulent activities.

When actuated, the panic button may cause various responses. Responses include, but are not limited to, initiating a phone call from a trusted agent to the user 102, causing an IoT device in the operating environment 100 to activate, or initiating a text message to the user 102 via the smartphone 104, smartwatch 110, or other client device.

The responsive actions may be programmed, configured, selected, or otherwise controlled by the user 102. For instance, the user 102 may configure the responsive action to include a call to a landline phone at the user's residence, a text to the user's smartphone 104, and an email to the user's email address. The phone call, text, or email may include various speaking prompts to aid the user 102 in disengaging from the fraudulent phone call, for instance.

Additional actions may also be configured, such as locking financial accounts, placing fraud alerts on credit accounts, or alerting authorities. These types of actions may be used after a transaction with a potential fraudster to secure accounts or other assets of the user 102.

Figure 2:
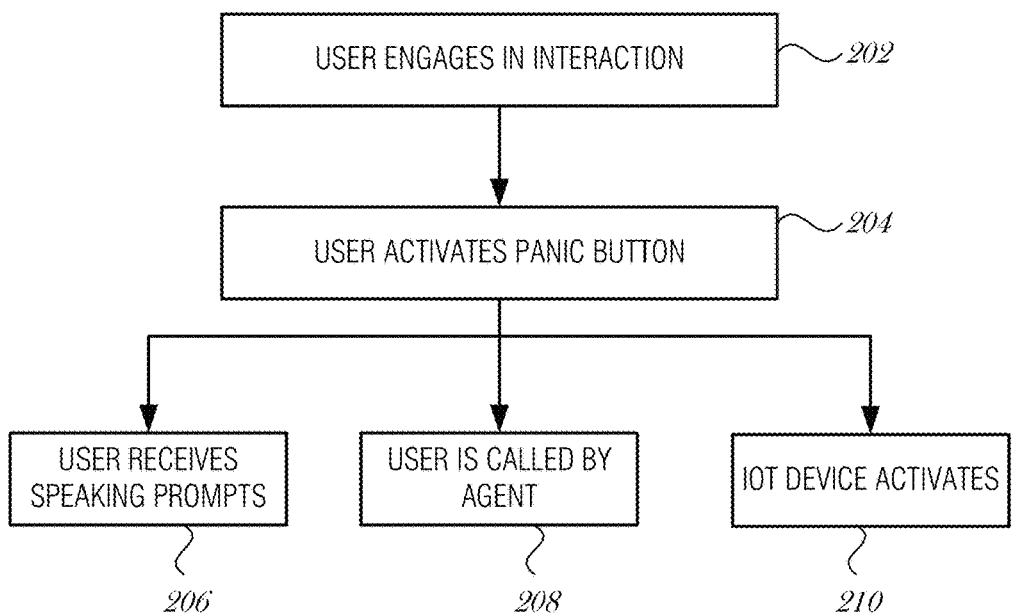
FIG. 2 is a flow diagram illustrating control and data flow for panic button responses, according to an embodiment.

FIG. 2 is a flow diagram illustrating control and data flow 200 for panic button responses, according to an embodiment. At stage 202, a user engages in an interaction. The interaction may be an in-person interaction or a remote interaction. An in-person interaction may be a door-to-door sales call, for example. A remote interaction may be a phone call, video conferencing call, person-to-person video call, or the like. The remote interaction call may be with a telemarketer, salesperson, or the like.

During the interaction, the user may feel pressured to purchase something, give to a charity, commit to an in-home sales presentation, or some other similar sales or marketing activity, or provide personal information (e.g., social security number, bank account number, date of birth, etc.). The user may be uncomfortable or unable to gracefully exit or otherwise terminate the interaction. As such, the user activates a panic button in stage 204.

The panic button may be accessible on the user's phone, for instance as a user interface element that is available on the home screen, in an app, on a lock screen, or placed elsewhere in the user interface. The panic button may have a simple interface for quick actuation, such as press and hold for three seconds, double click, triple click, slide to activate, or other user interface actions. While a user-interface-based panic button may be implemented to use a simple single-click or single-press to activate, in some examples, the panic button is implemented in a way to avoid accidental activation. As such, a secondary user interface element, such as a popup window, may be used as a confirmation step during activation of a panic button. This type of soft panic button may be implemented in any user interface accessible in the user's environment, such as on the user's smartphone, on a smart appliance (e.g., on a display of a smart refrigerator), on a home security panel, or the like.

Alternatively, the panic button may be implemented as a hard button, switch, or other activation mechanism. For instance, a hard button on a smartphone may be configured to act as a panic button. In an example, a power button on a smartphone is configured as a panic button when activated using a certain sequence, such as with a triple depression. In another example, a volume button may be used as a panic button when pressed and held for five seconds. It is understood that other implementations of hard buttons on a smartphone, smartwatch, wearable device, smart appliance, electronic assistant, or the like. Further, a hard button may be implemented with a dedicated device, such as a device in a key fob form that could be worn on a necklace, on a wrist, or held in a pocket. The hard button may be incorporated into a separate device, such as a television remote control, a garage door opener, a security control unit, a central home control unit, or other convenient device that may be accessed often or easily by the user.

Upon pressing or activating the panic button, one or more responsive actions may occur. These actions may be programmed or controlled by the user.

In many scenarios, people become unable to terminate a phone call with a pushy or aggressive salesperson. Such people may lack confidence in their position, become confused or flustered, or just feel overwhelmed. However, even though they are temporarily incapacitated, they may be able to read a script or other prompts that are provided to them. The autonomic function of reading allows a person to act even when they are under pressure.

As such, in an example, one responsive action is the provision of speaking prompts. In stage 206, the user is provided speaking prompts via a text message, email, or other mode. The speaking prompts may be displayed on a smartphone or in an augmented reality display in smartglasses, for example.

The speaking prompts may be relatively simple statements, including a single statement. For instance, the prompt may be: "Say: No thank you. Please take me off your mailing list. Goodbye. Action: hang up."

The speaking prompts may also be more complex or interactive. For instance, the speaking prompt may be: "Have you asked to be removed from the mailing list?" The user may answer in the negative and if so, then the prompt may continue with "Say: Please remove me from your mailing list and stop calling me."

In addition to speaking prompts or other actions, another responsive action is having a service agent or customer service representative call the user. In stage 208, an agent may call the user. The agent is a trusted person to the user. For instance, the agent may be a financial advisor, an insurance representative, a banking service agent, or similar. The agent may then provide speaking prompts to the user, obtain information about the potential fraudulent call, advise the user of how to lock accounts or contact police or other remedial actions in case the fraudster has already obtained sensitive information or access to accounts. The agent may provide other services such as reissuing a credit card, freezing accounts, adding notes to transactions, changing passwords or personal identification numbers (PIN), or the like.

In addition to speaking prompts, or in the alternative to speaking prompts, at stage 210, one or more IoT devices may be activated. The activations may be used as a way to disentangle the user from the phone call and for the user to terminate the phone call. IoT devices include such things as a smart doorbell, smart appliance, security system, home automation devices, smart thermostat, smart lighting, and the like.

The user may be able to configure, select, or control one or more of the IoT device actions that occur when a panic button is activated. Actions may be operations like a smart doorbell ringing, a fire alarm activating, or a smart washing machine chime activating. Similar to how a speaking prompt provides the user a guided mechanism to disengage from a phone call, IoT devices also provide such triggers. When the user hears the doorbell, fire alarm, or washing machine chime, the user is able to use this triggering event as an excuse to shorten or end a phone call.

Although the IoT device activation in stage 210 does not have to occur with speaking prompts from stage 206 or stage 208, they may be used together to provide the user with speaking prompts for the corresponding IoT device activation.

The response actions, such as those described in stages 206, 208, and 210 may be offered or available to the user based on a subscription or access level. For instance, the user may have access to simple text-based speaking prompts with a bronze-level access, interactive text-based speaking prompts with silver-level access, and interactive in-person speaking prompts with gold-level access. The user may have to pay more for different higher access levels. Access levels may be linked to accounts that the user has with the service provider of the responses.

For instance, the user may have a banking account with the service provider. If the user holds over a threshold amount of money in an account, then different access levels are provided to the user. As an example, if the user has deposits over $1,000, then the user has a bronze subscription corresponding services. If the user has deposits over $25,000, then the user is provided a silver subscription corresponding services. If the user has deposits over $100,000, then the user is provided a gold subscription and corresponding services. It is understood that other factors may be used to selectively provide various service levels to users, such as time with a service provider, amount spent with the service provider, amount deposited at the service provider, a number of referrals to the service provider, or the like.

Figure 3:
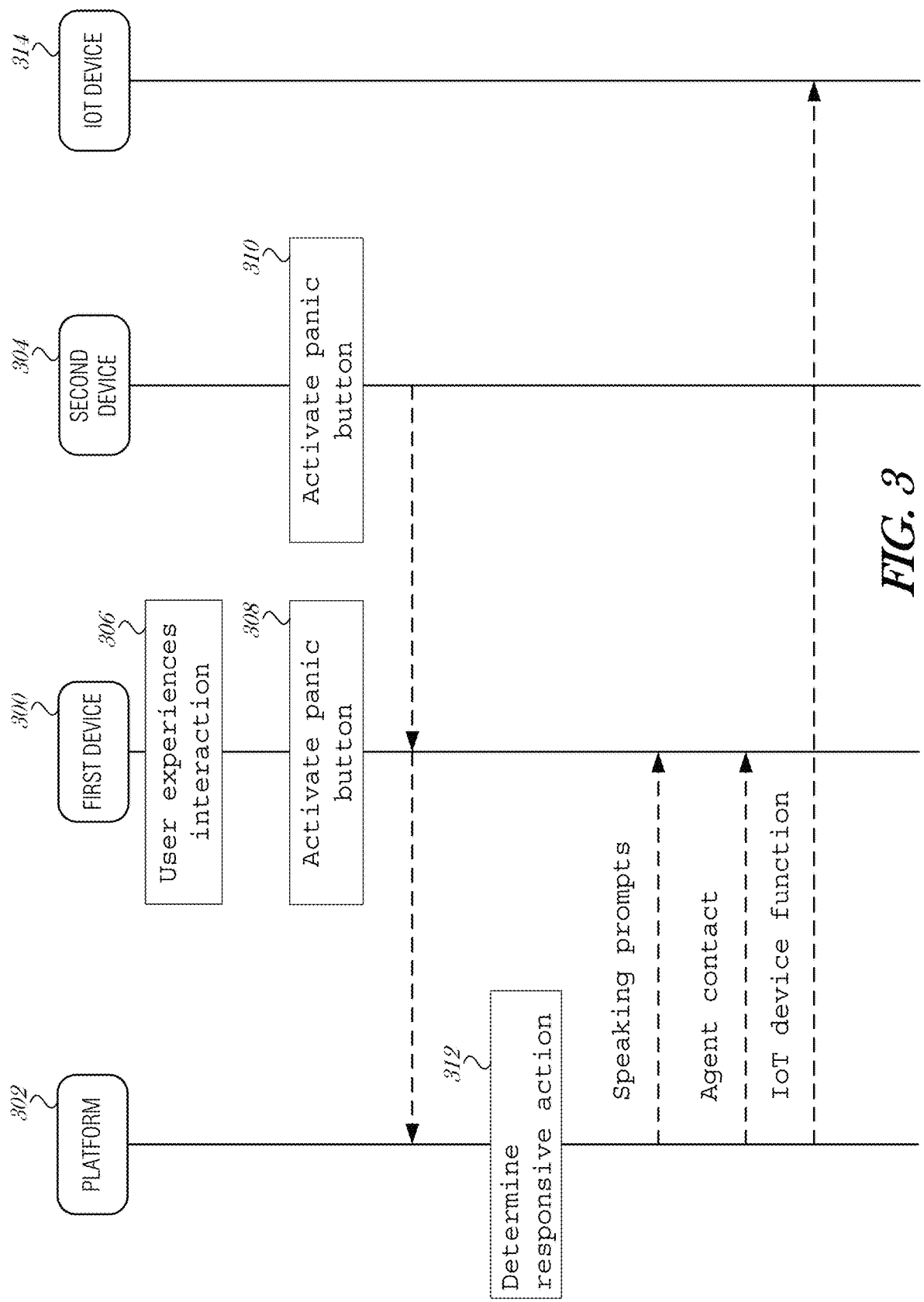
FIG. 3 is a swim lane diagram illustrating the interaction between user devices (first device and second device) with a platform to implement a panic button, according to an embodiment.

FIG. 3 is a swim lane diagram illustrating the interaction between user devices (first device 300 and second device 304) with a platform 302 to implement a panic button, according to an embodiment. A user interacts with a first device 300 and receives a communication. The first device 300 may be a smartphone, smartglasses, smartwatch, desktop computer, or other communication device capable of receiving a voice call or video call (operation 306). The communication may be a video call at a computer, mobile phone, smartphone, kiosk, tablet, or the like. A voice call communication may be a cellular call, a plain-old telephone system or landline call, an internet-based call, or the like.

During the call, the user may wish to terminate the call but is physically or psychologically incapable to do so. The user is able to then activate a panic button at the first device (operation 308). Alternatively, the panic button may be activated using the second device 304 (operation 310). The second device 304 may be a dedicated panic button device (e.g., in the form of a key fob), or may be a soft or hard button that is integrated into a different device (e.g., a smartwatch, an IoT device, or the like).

Depending on the path used to activate the panic button (either operation 308 or operation 310), the first device 300 or the second device 304 may connect to the platform 302. The platform 302 may be an independent service that provides panic button services. Alternatively, the platform 302 may be associated with a service that the user is already a member of, has a subscription to, or is otherwise associated with. For instance, the platform 302 may be the user's bank, financial service, or accountant. The first device 300 or second device 304 may use various secure methods to connect to the platform 302, such as over a secure HTTP link, using encryption, using public/private key encryption, or the like.

The platform 302 determines a responsive action (operation 312). This may include operations such as authenticating the identity of the user, determining user preferences, connecting with an IoT device associated with the user, or other operations to effect the responsive action. Depending on the type of response action or actions, the platform 302 can connect with the first device 300 to communicate a text message, email, or an in-app direct message to provide speaking prompts to the user, call the user at the first device 300, or connect with an IoT device 314 to activate an alarm, change a device state, or perform other actions at the IoT device 304.

As an illustrative example, a user may access an online banking service with an application on a smartphone (e.g., first device 300). The user may have a smart doorbell (e.g., second device 304). During a stressful phone call, the user may open the application on the smartphone and be presented with a panic button. After activating the panic button, the user may receive a text message with speaking prompts on the smartphone. The speaking prompts will guide the user to terminate the phone call. Alternatively, the smart doorbell may be activated in response to the panic button being used. This provides the user another way to redirect or terminate the phone call.

Figure 4:
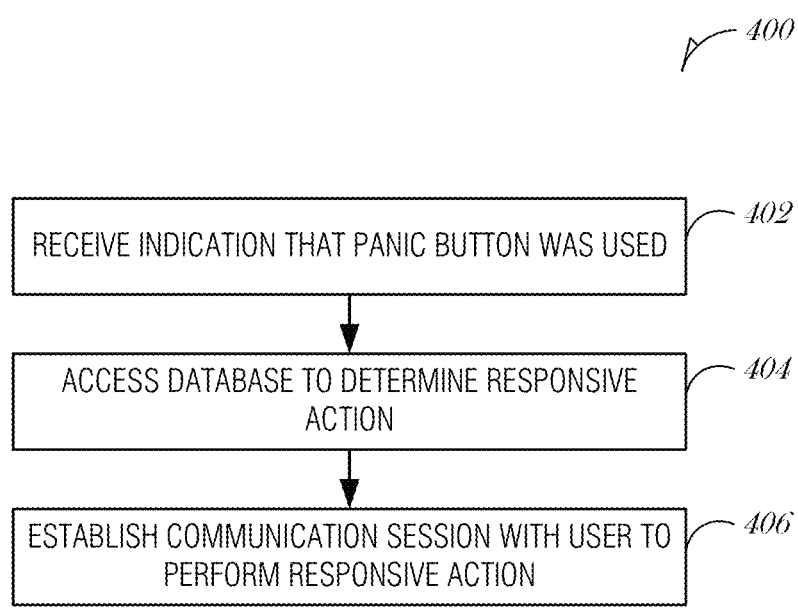
FIG. 4 is a flowchart illustrating a method of responding to a panic alarm, according to an embodiment.

FIG. 4 is a flowchart illustrating a method 400 of responding to a panic alarm, according to an embodiment. At block 402, an indication that a panic button was used by a user is received at a server. In an embodiment, the panic button was used by the user via a hard button. In a further embodiment, the hard button is disposed in a key fob.

In an embodiment, the panic button was used by the user via a soft button. In a further embodiment, the soft button is disposed in an application on a smartphone.

At block 404, a database is accessed to determine a responsive action, the responsive action being one of: transmitting a speaking prompt or activating a device function of a device associated with the user. In an embodiment, the database includes user preference data indicating which responsive actions to take in response to activation of the panic button.

In an embodiment, the speaking prompt includes a simple speaking prompt to terminate an interaction the user is having with another person. In an embodiment, the speaking prompt include an interactive speaking prompt to terminate an interaction the user is having with another person.

In an embodiment, accessing the database to determine the responsive action, includes determining a level of service for the user and determining the responsive action based on the level of service. In a further embodiment, the speaking prompt transmitted in the responsive action is more complex for a corresponding higher level of service.

At block 406, establishing a communication session with the user to perform the responsive action. In an embodiment, establishing the communication session comprises initiating a text-based communication to the user. In a further embodiment, the text-based communication includes a text message. In another embodiment, the text-based communication includes an email message. In another embodiment, the text-based communication includes an in-app direct message.

In an embodiment, establishing the communication session includes initiating a phone call from a trusted agent to the user. In a further embodiment, the trusted agent is a financial advisor of the user.

In an embodiment, establishing the communication session includes connecting to the device associated with the user and transmit a command to activate the device function. In a further embodiment, the device is an internet-of-things (IoT) device. In another embodiment, the device function includes sounding a doorbell. In another embodiment, the device function includes sounding an alarm.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
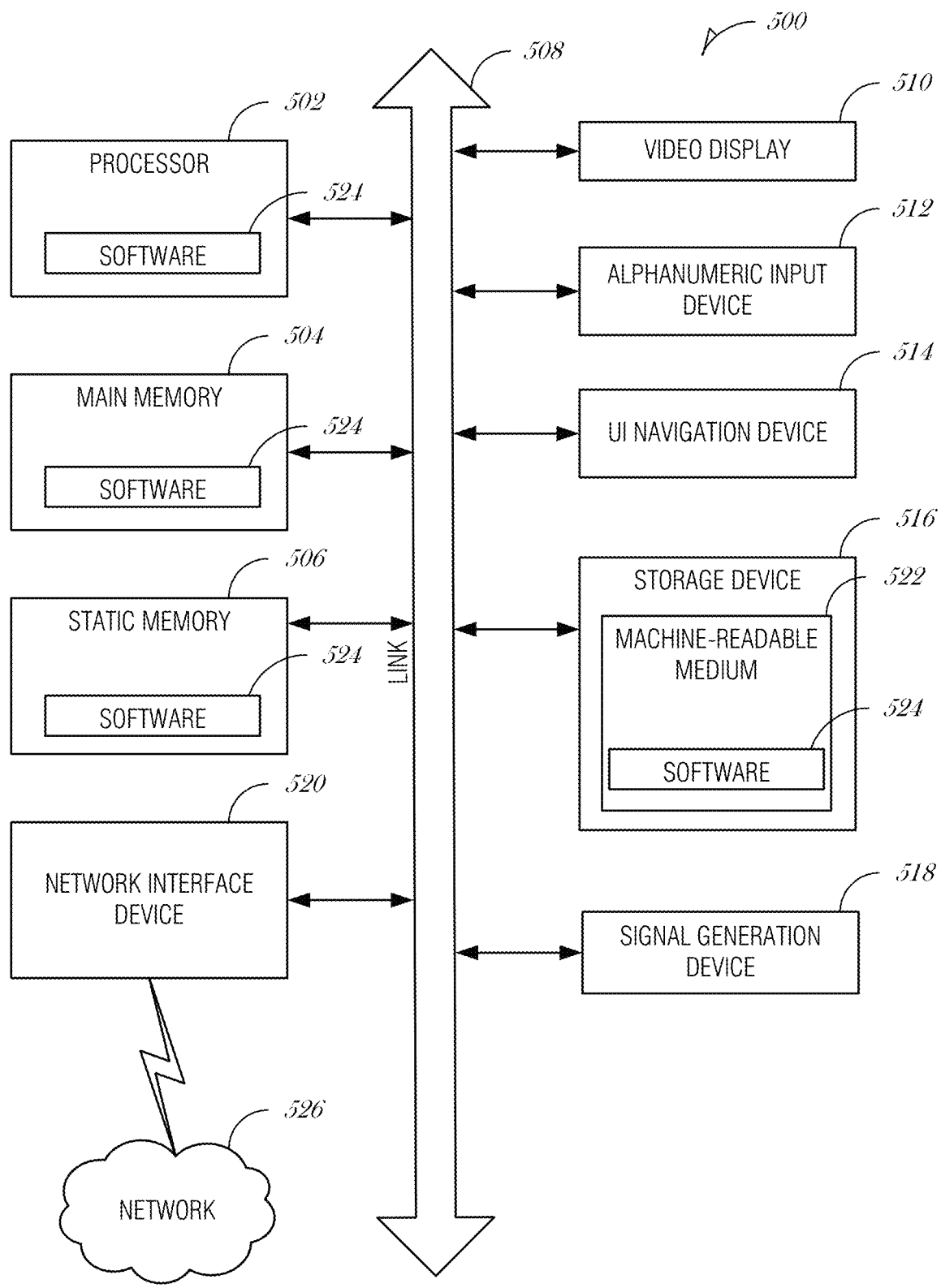
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, landline telephone networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a system for responding to a panic alarm, the system comprising: a processor subsystem; and a memory including instructions, which when executed by the processor subsystem, cause the processor subsystem to: receive at a server, an indication that a panic button was used by a user; access a database to determine a responsive action, the responsive action being one of: transmitting a speaking prompt or activating a device function of a device associated with the user; and establish a communication session with the user to perform the responsive action.

In Example 2, the subject matter of Example 1 includes, wherein the panic button was used by the user via a hard button.

In Example 3, the subject matter of Example 2 includes, wherein the hard button is disposed in a key fob.

In Example 4, the subject matter of Examples 1-3 includes, wherein the panic button was used by the user via a soft button.

In Example 5, the subject matter of Example 4 includes, wherein the soft button is disposed in an application on a smartphone.

In Example 6, the subject matter of Examples 1-5 includes, wherein the database includes user preference data indicating which responsive actions to take in response to activation of the panic button.

In Example 7, the subject matter of Examples 1-6 includes, wherein the speaking prompt includes a simple speaking prompt to terminate an interaction the user is having with another person.

In Example 8, the subject matter of Examples 1-7 includes, wherein the speaking prompt include an interactive speaking prompt to terminate an interaction the user is having with another person.

In Example 9, the subject matter of Examples 1-8 includes, wherein to establish the communication session, the processor subsystem is to initiate a text-based communication to the user.

In Example 10, the subject matter of Example 9 includes, wherein the text-based communication includes a text message.

In Example 11, the subject matter of Examples 9-10 includes, wherein the text-based communication includes an email message.

In Example 12, the subject matter of Examples 9-11 includes, wherein the text-based communication includes an in-app direct message.

In Example 13, the subject matter of Examples 1-12 includes, wherein to establish the communication session, the processor subsystem is to initiate a phone call from a trusted agent to the user.

In Example 14, the subject matter of Example 13 includes, wherein the trusted agent is a financial advisor of the user.

In Example 15, the subject matter of Examples 1-14 includes, wherein to establish the communication session, the processor subsystem is to connect to the device associated with the user and transmit a command to activate the device function.

In Example 16, the subject matter of Example 15 includes, wherein the device is an internet-of-things (IoT) device.

In Example 17, the subject matter of Examples 15-16 includes, wherein the device function includes sounding a doorbell.

In Example 18, the subject matter of Examples 15-17 includes, wherein the device function includes sounding an alarm.

In Example 19, the subject matter of Examples 1-18 includes, wherein to access the database to determine the responsive action, the processor subsystem is to: determine a level of service for the user; and determine the responsive action based on the level of service.

In Example 20, the subject matter of Example 19 includes, wherein the speaking prompt transmitted in the responsive action is more complex for a corresponding higher level of service.

Example 21 is a method of responding to a panic alarm, the method comprising: receiving at a server, an indication that a panic button was used by a user; accessing a database to determine a responsive action, the responsive action being one of: transmitting a speaking prompt or activating a device function of a device associated with the user; and establishing a communication session with the user to perform the responsive action.

In Example 22, the subject matter of Example 21 includes, wherein the panic button was used by the user via a hard button.

In Example 23, the subject matter of Example 22 includes, wherein the hard button is disposed in a key fob.

In Example 24, the subject matter of Examples 21-23 includes, wherein the panic button was used by the user via a soft button.

In Example 25, the subject matter of Example 24 includes, wherein the soft button is disposed in an application on a smartphone.

In Example 26, the subject matter of Examples 21-25 includes, wherein the database includes user preference data indicating which responsive actions to take in response to activation of the panic button.

In Example 27, the subject matter of Examples 21-26 includes, wherein the speaking prompt includes a simple speaking prompt to terminate an interaction the user is having with another person.

In Example 28, the subject matter of Examples 21-27 includes, wherein the speaking prompt includes an interactive speaking prompt to terminate an interaction the user is having with another person.

In Example 29, the subject matter of Examples 21-28 includes, wherein establishing the communication session comprises initiating a text-based communication to the user.

In Example 30, the subject matter of Example 29 includes, wherein the text-based communication includes a text message.

In Example 31, the subject matter of Examples 29-30 includes, wherein the text-based communication includes an email message.

In Example 32, the subject matter of Examples 29-31 includes, wherein the text-based communication includes an in-app direct message.

In Example 33, the subject matter of Examples 21-32 includes, wherein establishing the communication session comprises initiating a phone call from a trusted agent to the user.

In Example 34, the subject matter of Example 33 includes, wherein the trusted agent is a financial advisor of the user.

In Example 35, the subject matter of Examples 21-34 includes, wherein establishing the communication session comprises connecting to the device associated with the user and transmit a command to activate the device function.

In Example 36, the subject matter of Example 35 includes, wherein the device is an internet-of-things (IoT) device.

In Example 37, the subject matter of Examples 35-36 includes, wherein the device function includes sounding a doorbell.

In Example 38, the subject matter of Examples 35-37 includes, wherein the device function includes sounding an alarm.

In Example 39, the subject matter of Examples 21-38 includes, wherein accessing the database to determine the responsive action, comprises: determining a level of service for the user; and determining the responsive action based on the level of service.

In Example 40, the subject matter of Example 39 includes, wherein the speaking prompt transmitted in the responsive action is more complex for a corresponding higher level of service.

Example 41 is a machine-readable medium comprising instructions for responding to a panic alarm, which when executed by a machine, cause the machine to: receive at a server, an indication that a panic button was used by a user; access a database to determine a responsive action, the responsive action being one of: transmitting a speaking prompt or activating a device function of a device associated with the user; and establish a communication session with the user to perform the responsive action.

In Example 42, the subject matter of Example 41 includes, wherein the panic button was used by the user via a hard button.

In Example 43, the subject matter of Example 42 includes, wherein the hard button is disposed in a key fob.

In Example 44, the subject matter of Examples 41-43 includes, wherein the panic button was used by the user via a soft button.

In Example 45, the subject matter of Example 44 includes, wherein the soft button is disposed in an application on a smartphone.

In Example 46, the subject matter of Examples 41-45 includes, wherein the database includes user preference data indicating which responsive actions to take in response to activation of the panic button.

In Example 47, the subject matter of Examples 41-46 includes, wherein the speaking prompt includes a simple speaking prompt to terminate an interaction the user is having with another person.

In Example 48, the subject matter of Examples 41-47 includes, wherein the speaking prompt includes an interactive speaking prompt to terminate an interaction the user is having with another person.

In Example 49, the subject matter of Examples 41-48 includes, wherein to establish the communication session, the machine is to initiate a text-based communication to the user.

In Example 50, the subject matter of Example 49 includes, wherein the text-based communication includes a text message.

In Example 51, the subject matter of Examples 49-50 includes, wherein the text-based communication includes an email message.

In Example 52, the subject matter of Examples 49-51 includes, wherein the text-based communication includes an in-app direct message.

In Example 53, the subject matter of Examples 41-52 includes, wherein to establish the communication session, the machine is to initiate a phone call from a trusted agent to the user.

In Example 54, the subject matter of Example 53 includes, wherein the trusted agent is a financial advisor of the user.

In Example 55, the subject matter of Examples 41-54 includes, wherein to establish the communication session, the machine is to connect to the device associated with the user and transmit a command to activate the device function.

In Example 56, the subject matter of Example 55 includes, wherein the device is an internet-of-things (IoT) device.

In Example 57, the subject matter of Examples 55-56 includes, wherein the device function includes sounding a doorbell.

In Example 58, the subject matter of Examples 55-57 includes, wherein the device function includes sounding an alarm.

In Example 59, the subject matter of Examples 41-58 includes, wherein to access the database to determine the responsive action, the machine is to: determine a level of service for the user; and determine the responsive action based on the level of service.

In Example 60, the subject matter of Example 59 includes, wherein the speaking prompt transmitted in the responsive action is more complex for a corresponding higher level of service.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user device for responding to a panic alarm, the user device comprising:
   an input device;
   a display device;
   a processor subsystem including one or more processors; and
   a memory including instructions, which when executed by the one or more processors of the processor subsystem, cause the one or more processors to:
      receive, via the input device, an indication that a panic button was used by a user indicating the user needs assistance to intervene with an interaction with another person, wherein the interaction involves sales or marketing activities offered by the other person;
      transmit to a server, the indication that the panic button was used, the server configured to access a database to determine a script for the user to perform the intervention; and
      receive the script from the server; and
      present the script using the display device of the user device.

2. The user device of claim 1, wherein the panic button is disposed as a hard button on the user device.

3. The user device of claim 2, wherein the user device comprises a key fob.

4. The user device of claim 1, wherein the panic button is disposed as a soft button on the user device.

5. The user device of claim 4, wherein the soft button is displayed in an application user interface on the user device.

6. The user device of claim 1, wherein the database includes user preference data indicating which responsive actions to take in response to activation of the panic button.

7. The user device of claim 1, wherein the script for the user includes a simple script to terminate the interaction.

8. The user device of claim 1, wherein the script for the user includes an interactive script to terminate the interaction.

9. The user device of claim 1, wherein the script is presented as a text-based communication to the user.

10. The user device of claim 9, wherein the text-based communication includes a text message.

11. The user device of claim 9, wherein the text-based communication includes an email message.

12. The user device of claim 9, wherein the text-based communication includes an in-app direct message.

13. The user device of claim 1, wherein to receive the script from the server, the user device establishes a phone call with a trusted agent of the user.

14. The user device of claim 13, wherein the trusted agent is a financial advisor of the user.

15. A method of responding to a panic alarm initiated by a user with a user device, the method comprising:
   receiving, via an input device of the user device, an indication that a panic button was used by a user indicating the user needs assistance to intervene with an interaction with another person, wherein the interaction involves sales or marketing activities offered by the other person;
   transmitting to a server, the indication that the panic button was used, the server configured to access a database to determine a script for the user to perform the intervention;
   receiving the script from the server; and
   presenting the script using a display device of the user device.

16. The method of claim 15, wherein the database includes user preference data indicating which responsive actions to take in response to activation of the panic button.

17. The method of claim 15, wherein the script for the user includes a simple script to terminate the interaction.

18. The method of claim 15, wherein the script for the user includes an interactive script to terminate the interaction.

19. The method of claim 15, wherein the script is presented as a text-based communication to the user.

20. A non-transitory machine-readable medium comprising instructions for responding to a panic alarm, which when executed by a user device, cause the user device to:
   receive, via an input device, an indication that a panic button was used by a user indicating the user needs assistance to intervene with an interaction with another person, wherein the interaction involves sales or marketing activities offered by the other person;
   transmit to a server, the indication that the panic button was used, the server configured to access a database to determine a script for the user to perform the intervention;
   receive the script from the server; and
   present the script using a display device of the user device.

* * * * *